United States Patent

Fingerov et al.

[11] Patent Number: 6,008,721
[45] Date of Patent: Dec. 28, 1999

[54] METHOD OF CONVEYING INFORMATION TO NERVOUS SYSTEM OF A PERSON

[76] Inventors: Gavriil M. Fingerov, Kosmodiamianskay nab., d. 4/22, korp. 5 kv. 164, Moscow 113035, Russian Federation; Sergei V. Ilushenko, ul. Molodioznaya d. 6 kv. 155, Moscow 117290, Russian Federation

[21] Appl. No.: 09/104,500

[22] Filed: Jun. 25, 1998

[51] Int. Cl.$^6$ ....................................................... H04B 3/36
[52] U.S. Cl. .................................. 340/407.1; 340/407.2; 340/825.19; 348/62; 434/112; 434/114
[58] Field of Search ............................ 340/407.1, 407.2, 340/825.19; 348/62; 434/112, 114, 116

[56] References Cited

U.S. PATENT DOCUMENTS 3,628,193 12/1971 Collins et al. ...................... 340/407.1
5,091,865 2/1992 Yamada et al. ...................... 340/407.1
5,159,927 11/1992 Schmid ................................. 340/407.1
5,636,038 6/1997 Lynt et al. ........................... 340/825.19

Primary Examiner—Nina Tong
Attorney, Agent, or Firm—Llya Zborovsky

[57] ABSTRACT

A method of conveying information to a nervous system of a person has the steps of disintegrating an initial information into separate streams; coding each of the streams as a sequence of signals; transmitting the signals of each of the streams to separate fixed areas of a tactile sensitivity of a person which areas together form a total information zone; and cyclically changing a function of coding to ensure integration of a perceived information by a person, within limits of the cycle by choosing parameters of the function and a law changing the function in time.

11 Claims, 1 Drawing Sheet

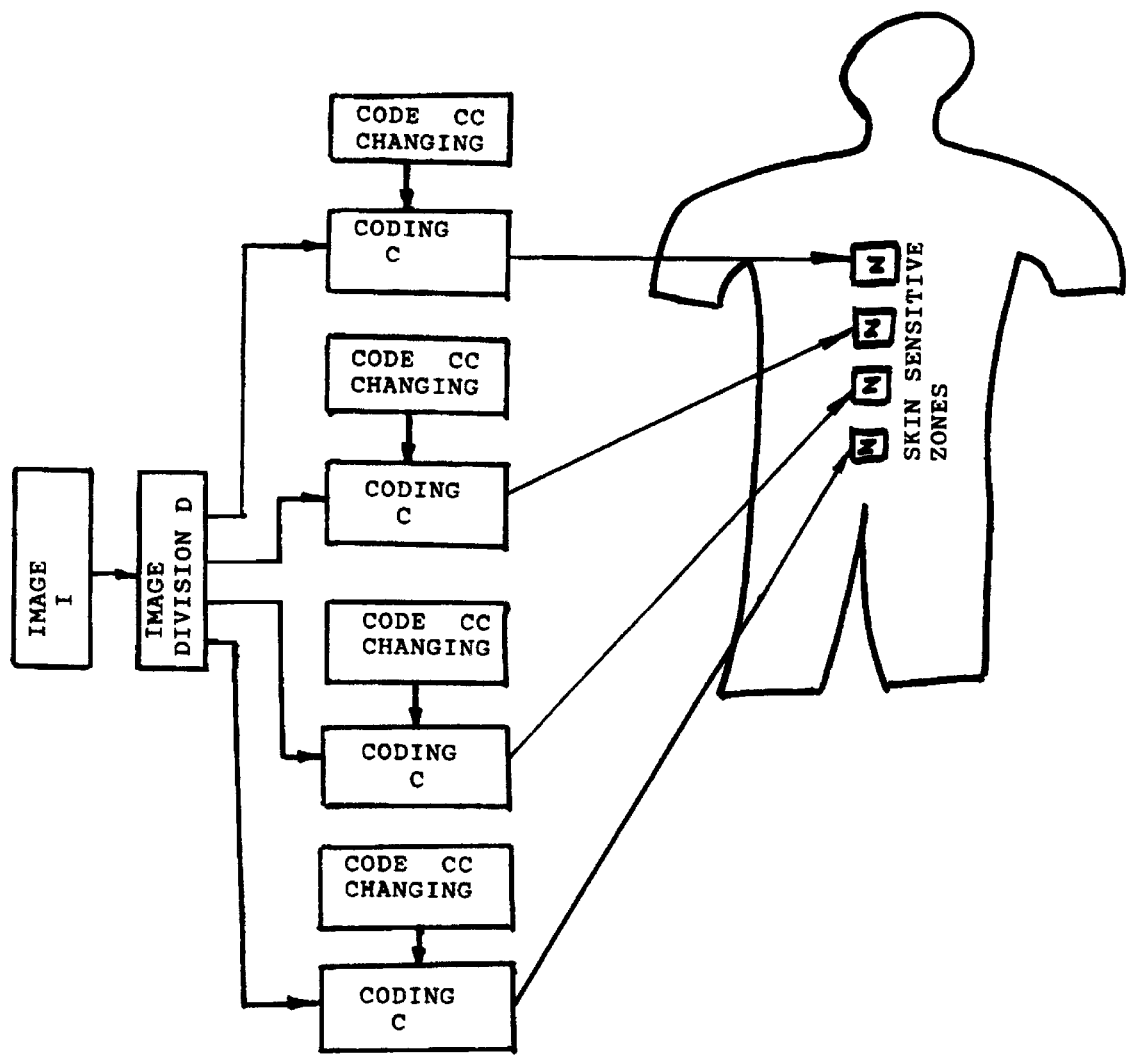

METHOD OF CONVEYING INFORMATION TO NERVOUS SYSTEM OF A PERSON

BACKGROUND OF THE INVENTION

The present invention relates to methods of conveying information to nervous system of a person. Such methods can be used by people with affected sensing organs, for example by blind or deaf people.

Methods of the above mentioned general type are known in the art. One of such well known methods is disclosed in the patent document WO 96/33481 of Oct. 24, 1996. The method disclosed in this reference deals with conveyor information to the nervous system of a person, which includes disintegration of an initial information into separate streams, coating each stream as a sequence of signals, and transmitting each stream signals to separate fixed points situated on the integument of a person formed in total tactile information zone. The above described method has a disadvantage that during transmission of signals to the sensitive skin information zone the receptors adapt to coming influences, and as a result their sensitivity reduces. Another disadvantage of the existing method is that strong signals not only activated receptors of the areas of the skin sensitive zone to which they are being transmitted, but also the receptors of adjacent points. As a result, the perception of relatively weak signals is suppressed by strong ones. Therefore the application of this method is accompanied by reducing discernibility of the signals perception and loss of information being sent to the skin sensitive zone.

SUMMARY OF THE INVENTION

Accordingly, it is an object of present invention to provide a method of conveying information to the nervous system of a person, which avoids the disadvantages of the prior art.

In keeping with these objects and with others which will become apparent hereinafter, one feature of the present invention resides, briefly stated, in a method of conveying information to the nervous system of a person, including disintegration of initial information into separate systems, streams, coding every stream as a sequence of signals, transmitting the signals of each stream to separate fixed areas of tactile sensitivity of a person in a total information zone, and in accordance with the main inventive feature, changing the function of coding cyclically during the process of conveying information so as to ensure integration of information perception within the limits of the cycle by choosing the parameters of the function and the law of changing the function in time.

For example, conveying of visual information in accordance with the inventive method is performed with electrical signals discretely framed by frame, with a cyclical frame by frame changing of current intensity and/or voltage and/or frequency from the illumination of a corresponding frames fragments and integration of frames perception within the limits of a cycle ensured with choosing of time characteristics of the cycles.

In accordance with the invention, the dependency of current intensity and/or voltage and/or frequency of these parameters of the signals from the illumination of the corresponding fragment is direct (positive frames) for some fragments and is inverse (negative frames) for the other fragments and the number of the positive frames can be more or less than the number of the negative ones, while the current frequencies of the positive and negative frames can differ.

When the method is performed as described above, the receptors' adaptation is suppressed and the areas of weak signals can be marked out separately.

Conveyance of the audio information can be carried out with vibrational signals. The pitch of sounds can be coded with vibration frequency and the sound volume can be coded with an amplitude with cyclic change of dependency of wiper stimulation amplitude from the corresponding sound frequency amplitude. The dependency is direction (positive) in one part of a cycle and is inverse (negative) in the other part of the cycle. The integration of the recycle perception is ensured with choosing of such time characteristics of a cycle which permits marking out of relatively weak vibro-signals from the strong ones separately.

BRIEF DESCRIPTION OF THE DRAWINGS

The single FIGURE of the drawings is a view showing the inventive method of conveying information to nervous system of a person.

DESCRIPTION OF PREFERRED EMBODIMENTS

The versions of embodiments of the above-mentioned method, of the method related to transmitting the signals from the visual image to the skin sensitive information zone are given below. According to the given version of the method the image I perceived by a TV camera is being divided (D) into fragments and each fragment is placed in correspondence with an area of the skin sensitive information zone (Z). The information about the illumination of each fragment is to be coded (C) as an electrical signal that is transmitted to the area of the skin sensitive zone (Z) corresponding to the given fragment. The function of coding information about the illumination of each fragment lies in establishing one valued correspondence between the illumination of the fragment and the intensity of the signal corresponding to ft. The intensity of the signal is to be determined in its turn with the strength of current impulse and/or voltage applied to the area of the skin sensitive information zone corresponding to the given fragment. In such embodiment of the method the difference between the illumination of the fragments is coded with the difference of the intensity of electrical skin stimulation or electrical tactile stimulation of the information zone areas. The image signals are to be transmitted to the skin sensitive information zone (Z) with frames. The function of coding is to be changed cyclically (C) to suppress the receptors' adaptation to the signals transmitted to them and for better perception of the information transmitted to the skin sensitive, information zone. For example, a cycle of changing the function of coding may consist of 5 frames; in this case the function of coding is linear for the first frame, it is parabolic for the second frame and logarithmic for the third frame etc. After transmitting the fifth frame with its function of coding transmitting the next frame occurs with the function of coding corresponding to the first frame of the cycle, e.g. the function of coding becomes linear again.

The embodiment of the method can be illustrated with the following example shown in Table 1. A cycle of changing a function of coding is defined with a table. The table shows a uniform dependence between the transformed illumination of a fragment and the transformed intensity of electrical skin stimulation corresponding to the fragment of an area of the skin sensitive information zone. The transformed illumination equal to 0 corresponds to a black e.g. not illuminated fragment of the image. The illumination equal to 1 corresponds to as much as possibly bright fragment of the image. The transformed illumination of electrical skin stimulation equal to 0 corresponds to the current impulse transmitted to the area of the skin sensitive information zone with the strength of 0.6 mA and equal to 1–3.2 mA. In this case the current intensity changes within the given limits according to the linear law.

TABLE 1

| The fragment number | Transformed illumination of a fragment | | | | | |
|---|---|---|---|---|---|---|
| | 0 | 0,2 | 0,4 | 0,6 | 0,8 | 1 |
| 1 | 0 | 0,2 | 0,4 | 0,6 | 0,8 | 1 |
| 2 | 0 | 0,1 | 0,3 | 0,7 | 0,9 | 1 |
| 3 | 0 | 0,1 | 0,25 | 0,50 | 0,75 | 1 |
| 4 | 0 | 0,06 | 0,20 | 0,75 | 0,8 | 1 |
| 5 | 0 | 0,04 | 0,15 | 0,45 | 0,7 | 1 |
| | Transformed intensity of electrical skin stimulation | | | | | |

Coding the illumination of each fragment during translation of each frame is determined by the function of coding corresponding to this fragment. Thus for the first frame of the cycle the function of coding is linear and is determined by the first line of the table, for the second frame the function is determined by the second line etc. The table shows as example of a direct, or positive, function of coding, when the greater intensity of electrical skin stimulation corresponds to the greater illumination. A cycle can also consist of positively and negatively coded frames. In case of the negative coding of the frame the function of coding is inverse, i.e. the more the illumination of the fragment is the less is the illumination intensity of the corresponding to it area of the skin sensitive information zone. It results in coding the dark and the light fragments with different frequencies of electrical skin stimulation in the image being conveyed. Thus if a cycle consists of three positive and one negative frame the frequency of electrical stimulation of the light fragments is three times more than the frequency of electrical stimulation of the dark fragments. In this case the dark differs from the light not only by the intensity of electrical skin influence but it is also exceptional in the frequency of stimulation and electrical tactile sensitivity is rather high in reference to it. Transmitting signals to the skin sensitive information zone with the frequency equal to 25–120 frames a second permits to form cycles of changing function of coding consisting of 3–10 tames. In this case the information being conveyed is perceived by a person integrally and with the great resolution in comparison with well-known method.

The function of coding not only includes determining dependence between the illumination of a fragment and the intensity of stimulation. Electrical skin stimulation of the areas of the skin sensitive information zone is carried out with current impulses than can follow witfidifferent frequencies and have different duration. Therefore the cyclicity of changing the function of coding may relate both to the change of the dependence of current intensity and/or voltage from the illumination and to the change frequency of the current impulses proceeding and/or of their duration. In this case the method can be carried out as follows. The dependence of the impulse current intensity from the illumination is the same for all the frames; i.e. it may be linear. However the frequency of current impulses proceeding differs for each frame of the cycle. For example, a cycle consists of 4 frames, then the frequency of current impulses proceeding is equal to 150 Hz for the first frame of the cycle of changing the function of coding, for the second frame the frequency is equal to 180 Hz. It is equal to 200 Hz for the third frame and 220 Hz for the fourth one.

In particular the frames coded positively include signals as current impulses with frequency for example of 100 Hz and the frames coded negatively consist of current impulses with frequencies for example 150 Hz. In this case the opportunity for additive distinguishing the information coming to the skin sensitive zone are formed.

Realization of this method when the difference in the fragments' illumination is coded with the difference in the intensity of electrical skin stimulation of the areas of the skin sensitive information zone or of electrical tactile stimulation but the signals about the image are being transmitted to the information zone of the skin not discretely (frame by frame) but with analogous way (continuously). In this case the cycle of changing the function of coding may consist for example of 5 time intervals. In this case for the first time interval the function of coding may be linear, during the second interval the function may be parabolic, the third function may be logarithmic etc. Coding illumination of every fragment during transmitting an image is determined with the function of coding corresponding to the current time interval of the cycle of the function of coding. After transmitting the signals of the fifth time interval with its function of coding transmitting the signals following after the previous ones is to be carried out with the function of coding corresponding to the first time interval of the cycle, i.e. the function of coding becomes linear again. In this case a cycle may exist of time intervals with positively and negatively coded distinctions in the illumination of an image. In case of the negative coding of the time interval of a cycle the function of coding is inverse, i.e. the greater the illumination of a fragment is the less is the intensity of stimulation of the corresponding to it area of the skin sensitive information zone. It leads to coding dark and light fragments of the image being transmitted with different fragment of electrical skin stimulation. So if a cycle consists of 3 positive and one negative time intervals the frequency of electrical stimulation of the light fragments is three times more than the frequency of electrical stimulation of the dark fragments. In this case the dark differs from the light not only in intensity of electrical skin influence but it also stands out for the frequency of stimulation.

This method was tested by experiments repeatedly and thoroughly. The experiments confirmed its efficiency and advantages in comparison with the known methods of the analogous purpose.

We claim:

1. A method of conveying information to a nervous system of a person, comprising the steps of disintegrating an initial information into separate streams; coding each of the streams as a sequence of signals; transmitting the signals of each of the streams to separate fixed areas of a tactile sensitivity of a person which areas together form a total information zone; and during conveying information, cyclically changing a function of coding to ensure integration of a perceived information by a person within limits of the cycle, by choosing parameters of the function and a law changing the function in time.

2. A method as defined in claim 1, wherein said disintegrating a visual information includes disintegrating of a visual information to be carried discretely frame by frame, said coding including changing a dependency of intensity of a signal from a brightness of corresponding fragments of the frames, and ensuring the integration of a perception of the frames within the limits of the cycle by choosing time characteristics of the cycles.

3. A method as defined in claim 2; and further comprising selecting the dependency of intensity of a signal from the brightness of the corresponding fragment to be direct for some frames of the cycle which are positive frames and to be inverse for the other part of the frames of the cycle which are negative frames.

4. A method as defined in claim 3; and further comprising the step of selecting a number of the positive frames which is greater than a number of the negative frames within the limits of the cycle.

5. A method as defined in claim 3; and further comprising the step of selecting a number of positive frames to be lower than a number of the negative frames within the limits of the cycle.

6. A method as defined in claim 3; and further comprising the step of selecting a frequency of signals in the negative and positive frames to be different.

7. A method as defined in claim 1, wherein said disintegrating a visual information includes disintegrating of a visual information to be carried discretely frame by frame, said coding including changing a dependency of frequency of a signal from a brightness of corresponding fragments of the frames, and ensuring the integration of a perception of the frames within the limits of the cycle by choosing time characteristics of the cycles.

8. A method as defined in claim 7; and further comprising selecting the dependency of frequency of a signal from the brightness of the corresponding fragment to be direct for some frames of the cycle which are positive frames and to be inverse for the other part of the frames of the cycle which are negative frames.

9. A method as defined in claim 8; and further comprising the step of selecting a number of the positive frames which is greater than a number of the negative frames within the limits of the cycle.

10. A method as defined in claim 8; and further comprising the step of selecting a number of positive frames to be lower than a number of the negative frames within the limits of the cycle.

11. A method as defined in claim 8; and further comprising the step of selecting a frequency of signals in the negative and positive frames to be different.

* * * * *